United States Patent
Ueda et al.

(10) Patent No.: US 6,639,756 B2
(45) Date of Patent: Oct. 28, 2003

(54) MAGNETIC HEAD HAVING RAISED ELEMENT AND MAGNETIC HEAD APPARATUS USING THE SAME

(75) Inventors: Junsei Ueda, Niigata-ken (JP); Tomoo Otsuka, Niigata-ken (JP); Hirohisa Ishihara, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/989,484

(22) Filed: Nov. 20, 2001

(65) Prior Publication Data
US 2002/0063994 A1 May 30, 2002

(30) Foreign Application Priority Data
Nov. 27, 2000 (JP) ........................................ 2000-358696

(51) Int. Cl.⁷ ........................... G11B 5/60; G11B 15/64; G11B 17/32; G11B 21/20
(52) U.S. Cl. .................................. 360/235.8; 360/235.7
(58) Field of Search ............................ 360/235.8, 235.7, 360/235.5, 235.4, 234.3, 234, 230, 236.5, 236.6, 235.9, 236.7

(56) References Cited

U.S. PATENT DOCUMENTS

| | | | |
|---|---|---|---|
| 5,267,109 A | | 11/1993 | Chapin et al. ............ 360/236.5 |
| 5,917,678 A | * | 6/1999 | Ito et al. .................. 360/235.4 |
| 2001/0030834 A1 | * | 10/2001 | Kohira et al. ............. 360/235.8 |
| 2002/0063995 A1 | * | 5/2002 | Sannino et al. ........... 360/236.3 |
| 2002/0075593 A1 | * | 6/2002 | Ultican et al. .............. 360/122 |

FOREIGN PATENT DOCUMENTS

JP 3062089 B2 4/2000

* cited by examiner

Primary Examiner—Julie Anne Watko
(74) Attorney, Agent, or Firm—Brinks Hofer Gilson & Lione

(57) ABSTRACT

A trailing ABS face, which is a surface generating positive pressure, is formed to rise from a surface facing a recording medium, which is a surface generating negative pressure, toward the recording medium and furthermore, a surface facing the element, in which a gap portion of a magnetic element is located, is formed to rise from the trailing ABS face. Thereby, the floating lift of a magnetic head can be reduced while the floating position can be stabilized and furthermore, collision of the magnetic head with a disk surface can be properly avoided.

64 Claims, 12 Drawing Sheets

MAGNETIC HEAD HAVING RAISED ELEMENT AND MAGNETIC HEAD APPARATUS USING THE SAME

BACKGROUND OF THE INVENTION

1. Field of the Invention

The present invention relates to a magnetic head which is mounted on a hard disk device, etc., and scans a recording surface of the disk by a CSS system or the like and a magnetic head apparatus having the magnetic head thereon, and in particular it relates to a magnetic head capable of achieving reduction in the lift of the magnetic head while enabling the magnetic head to have the floating stability and collisions of the magnetic head with a disk surface to be properly avoided and a magnetic head apparatus having the magnetic head thereon.

2. Description of the Related Art

FIG. 14 is a schematic view of a conventional magnetic head M1 with a surface 1 facing a recording medium and shown upwardly.

As shown in FIG. 14, on an end-face 3 in the trailing side T of a slider S1, a magnetic element 13 made of a ceramic material is formed, which comprises a thin-film recovery element utilizing a magnetoresistive effect and an inductive type thin-film recording element. The magnetic element 13 is covered with a protecting layer 4 made of alumina, etc. Furthermore, on an end-face 4a in the trailing side T of the protecting layer 4, terminal parts 5 connected to the magnetic element are formed.

As shown in FIG. 14, in the substantially central portion of the slider S1 in the trailing side T, an ABS face 6 in the trailing side is formed so as to rise from a surface 1 facing a recording medium toward a disk surface. As shown in FIG. 14, a gap portion G of the magnetic element 13 is exposed from the ABS face 6.

Moreover, the slider S1 shown in FIG. 14 is provided with rail faces 7 and 7 formed from the leading side R toward the trailing side T so as to rise from the surface 1 facing the recording medium. Both the rail faces 7 and 7 are connected together via a step face 8 raised from the from the surface 1 facing the recording medium so as to have the same height as that of the rail face 7.

As shown in FIG. 14, on end faces of the rail faces 7 and 7 in the trailing side, side ABS faces 9 and 10 are formed which are raised from the surface 1 facing the recording medium so as to have the same heights as that of the ABS face 6 in the trailing side.

Furthermore, in the leading side R, a leading ABS face 11 is also formed which is raised from the step face 8 so as to have the same height as that of the ABS face 6 in the trailing side.

As shown in FIG. 15, the magnetic head M1 is elastically supported by a supporting member formed of a flexure 12 and a load beam 14 from the surface opposite to the surface 1 facing the recording medium.

In the CSS system, the magnetic head M1 makes in contact with a disk D at the beginning.

Air flows over the disk surface between the disk and the magnetic head M1 from the leading side R when the disk rotates. Due to this airflow, positive pressure is applied on the ABS faces 6, 9, 10, and 11 so as to float the magnetic head M1.

On the other hand, on the surface 1 facing the recording medium surrounded by the rail faces 7 and 7 and the step face 8, negative pressure is applied so as to absorb the magnetic head M1 to the disk.

Simultaneously with starting of the disk D, a floating force is applied to the magnetic head M1 due to the airflow on the disk surface, so that the magnetic head M1 is floated in an inclined position in which the leading side R is raised from the disk D, and scans the disk surface in a position in that the trailing side T of the magnetic head M1 is slightly floated from the disk D. In FIG. 15, the lift from the disk D to a gap portion G of a magnetic element 13 is indicated by X1.

In FIG. 14, the face exposing the gap portion G of the magnetic element 13 is the trailing ABS face 6 on which positive pressure is applied, and which is formed the highest from the surface 1 facing the recording medium identically to other ABS faces so that the lift X1 between the disk face and the gap portion G of a magnetic element 13 can be easily set to be small when the magnetic head M1 is floated over the disk D. Reduction in the lift X1 has been demanded with recent increasing of the recording density of the disk D.

However, when there are such advances in the reduction of the lift X1, when the magnetic head M1 is inclined in the pitching direction or rolling direction, an edge 6c in the trailing side of the ABS face 6 in the trailing side or corners 6a and 6a in the trailing side T of the ABS face 6 in the trailing side may collide with the disk D so as to damage the magnetic head M1 or the disk surface.

In the magnetic head M1 shown in FIG. 14, there has also been a problem that because in regions on both sides of the trailing ABS face 6 in the lateral direction (X-direction in the drawing), the ABS faces 9 and 10 raised from the surface 1 facing the recording medium are formed, especially when the magnetic head M1 is in a floated position inclined in the rolling direction, the ABS faces 9 and 10 are liable to collide with disk D so as to damage the magnetic head M1 or the disk surface.

The floated position of the magnetic head M1 is determined by a balance between three factors, i.e., positive and negative pressures and an elastic force of the supporting member.

As shown in FIG. 14, however, because the face exposing the gap portion G of the magnetic element 13 is the trailing ABS face 6 directly raised from the surface 1 facing the recording medium on which the negative pressure is applied, and the height of the trailing ABS face 6 from the surface 1 facing the recording medium is very large, the airflow flowing from the leading side R collides with an end face 6d in the leading side vertically extending from the surface 1 facing the recording medium toward the recording medium and the airflow is thereby difficult to be smoothly led to the trailing ABS face 6, so that the floated position of the magnetic head M1 is liable to be destabilized by losing the balance between positive and negative pressures and the elastic force.

SUMMARY OF THE INVENTION

Accordingly, in order to solve conventional problems described above, it is an object of the present invention to provide a magnetic head and a magnetic head apparatus using the magnetic head in which reduction of a floating lift of the magnetic head is especially planned while a collision of the magnetic head with a disk surface can be appropriately avoided and furthermore a floated position can be stabilized.

In accordance with a first aspect of the present invention, a magnetic head comprises a slider and a magnetic element disposed on an end face of the slider in the trailing side for writing and/or reading, wherein a plurality of ABS faces are formed on a surface of the slider facing a recording medium so as to rise toward the recording medium and be at the same level as each other, the plurality of ABS faces serving to generate positive pressure, and wherein a surface facing the element is formed on the ABS face in the trailing side so as to further rise toward the recording medium, and a gap portion of the magnetic element is located on the surface facing the element.

In the present invention, because the surface facing the element, in which the gap portion of the magnetic element is located, is formed to rise from the trailing ABS face which is a surface generating positive pressure, the gap portion of the magnetic element can be more properly brought closer to the disk surface, enabling reduction in the lift of a future magnetic head to be achieved.

Moreover, according to the present invention, the surface facing the element can be formed to have a size including at least the gap portion of the magnetic element and to have an area smaller than that of the ABS face, so that even when the magnetic head according to the present invention is inclined in the rolling or pitching direction, trailing edges and corners of the surface facing the element are difficult to collide with the recording medium, enabling damages to the magnetic head and the recording medium to be properly prevented.

As in the present invention, when the surface facing the element is further formed on the ABS face formed to rise from the surface facing the recording medium, the height of the ABS face can be reduced by the raised height of the surface facing the element, and a leading end face is raised from the surface facing the recording medium toward the ABS face and the surface facing the element via at least two steps, so that air may flow smoothly from the surface facing the recording medium toward the surface facing the element compared with a conventional apparatus, so that positive and negative pressures and an elastic force can be well-balanced, enabling the floating position of the magnetic head to be stabilized.

In the present invention, preferably, when the height from the surface facing the recording medium to the ABS face is h1 and the height from the ABS face to the surface facing the element is h2, the ratio h2/h1 is at least 0.4% and 2.5% at most.

That is, the height from the ABS face to the surface facing the element is extremely smaller compared to the height from the surface facing the recording medium to the ABS face. The positive pressure is generated not only on the ABS face but also on the surface facing the element; however, when the height of the surface facing the element raised from the ABS face is extremely small as mentioned above, the intensity of positive pressure generated on the ABS face is substantially maintained constant almost independently of the raised height of the surface facing the element, and positive and negative pressures and the elastic force can be well-balanced, enabling the floating position of the magnetic head to be stabilized.

In the present invention, preferably, between a leading edge of the trailing ABS face and the surface facing the recording medium formed is a step face having a height lower by one step than that of the ABS face. The step face serves as an introducing end for properly leading airflow toward the ABS face. Thereby, the airflow is smoothly led from the surface facing the recording medium toward the ABS face and the surface facing the element, so that positive and negative pressures and the elastic force can be well-balanced, enabling the floating position of the magnetic head to be stabilized.

In the present invention, a leading end face of the trailing ABS face and a leading end face of the surface facing the element may be preferably inclined surfaces which gradually rise from the surface facing the recording medium toward the surface facing the element. Thereby, the airflow may be more smoothly led from the surface facing the recording medium between the magnetic head and the disk and toward the ABS face and the surface facing the element, enabling the floating position of the magnetic head to be more stabilized.

In the present invention, preferably, a side face of the surface facing the element is provided with an inclined surface formed thereon which starts from a trailing edge of the surface facing the element and gradually approaches a side face of the slider when proceeding toward the leading, and wherein a gap portion of the magnetic element is located inside the inclined surface.

Even when the magnetic head has a floating position inclined in the rolling or pitching direction, trailing edges and corners of the surface facing the element are thereby difficult to collide with the disk surface, enabling damages to the magnetic head and the disk to be properly prevented.

In the present invention, it is more preferable that both side faces of the surface facing the element and the trailing ABS face be provided with respective inclined surfaces formed thereon which start from respective trailing edges of the surface facing the element and the trailing ABS face and gradually approach a side face of the slider when proceeding toward the leading side, and wherein a gap portion of the magnetic element be located inside the inclined surfaces.

Even when the magnetic head has a floating position inclined in the rolling or pitching direction, trailing edges and corners of both the surface facing the element and the ABS face are thereby difficult to collide with the disk surface, enabling damages to the magnetic head and the disk to be properly prevented.

In the present invention, the inclined surface of the surface facing the element and the inclined surface of the trailing ABS face may be continuous. Thereby, the inclined surfaces formed on both the surface facing the element and the ABS face can be readily formed.

In the present invention, it is more preferable that two of the inclined surfaces be provided so as to have an apex formed at a trailing edge and gradually approach both lateral side-faces of the slider when proceeding toward the leading-side, respectively, and wherein a gap portion of the magnetic element be located at a position sandwiched between the two inclined surfaces. Thereby, the trailing edges are furthermore difficult to collide with the disk surface, enabling damages to the magnetic head and the disk to be more properly prevented.

In the present invention, it is preferable that an inclination θ1 of the inclined surface relative to the width direction of the slider be at least 20° and 60° at most. Within this range, collision of the disk surface with the trailing edges of the surface facing the element and/or the ABS face can be properly avoided while the gap portion of the magnetic element can be properly located inside the inclined surface.

In the present invention, the apex may preferably have a curved surface. Thereby, collision of the disk surface with the apex can be properly avoided, enabling damages to the magnetic head and the disk to be more properly prevented.

In the present invention, it is preferable that the surface facing the recording medium extend between the ABS faces and both side faces of the slider. That is, in bilateral regions between the ABS face and the both side faces of the slider, a raised face such as the ABS face is not formed to rise from the surface facing the recording medium. When the magnetic head has a floating position inclined especially in the rolling direction, collision of the disk with the ABS face and the bilateral side faces of the slider can be avoided, enabling damages to the magnetic head and the disk to be properly prevented.

In accordance with a second aspect of the present invention, a magnetic head comprises a slider and a magnetic element disposed on an end face of the slider in the trailing side for writing and/or reading, wherein a surface facing an element is formed in the trailing side to be raised from a surface of the slider facing a recording medium, side faces of the surface facing the element having inclined surfaces starting from the trailing side and gradually approaching side faces of the slider when proceeding toward the leading-side, wherein the surface facing the recording medium extends between both the side faces of the slider, and wherein a gap portion of the magnetic element is located on the surface facing the element and between the inclined surfaces.

In the present invention described above, even when the magnetic head has a floating position inclined in the rolling or pitching direction, collision of the disk with the trailing edges of the surface facing the element, the surface facing the element, and the bilateral side faces of the slider, is properly avoided, enabling damages to the magnetic head and the disk to be properly prevented.

In the present invention, a surface other than the surface facing the element may be preferably formed so as to rise from the surface facing the recording medium, and the surface facing the element may be preferably closest to the recording medium.

During floating of the magnetic head, the gap portion of the magnetic element can be brought closer to the disk surface, enabling reduction in the lift of the magnetic head accompanied by future improvement in recording density of the disk surface to be achieved.

In accordance with a third aspect of the present invention, a magnetic head apparatus comprises any magnetic head described above and a supporting member for elastically supporting the magnetic head from the side opposite to the surface facing the recording medium. Thereby, reduction in the floating lift of the magnetic head can be achieved while collision of the magnetic head with the disk surface can be properly avoided, further enabling the magnetic head apparatus capable of stabilizing floating of the magnetic head to be readily produced.

According to the present invention described above in detail, because the surface facing the element, in which the gap portion of the magnetic element is located, is formed to rise from the trailing ABS face which is a surface generating positive pressure, the gap portion of the magnetic element can be more properly brought close to the disk surface while the floating position can be stabilized and collision with the disk surface can be properly avoided.

According to the present invention, side faces of the surface facing the element may be provided with inclined surfaces formed thereon which start from a trailing edge of the surface facing the element and gradually approach side faces of the slider when proceeding toward the leading side, so that even when the magnetic head is inclined in the rolling or pitching direction, collision of the disk surface with the surface facing the element can be avoided, enabling damages to the magnetic head and the disk to be properly prevented.

Moreover, in the present invention, because the bilateral sides of the surface facing the element may be formed of only the surface facing the recording medium which has the lowest height, even when the magnetic head is inclined especially in the rolling direction, collision of the disk surface with the magnetic head can be properly avoided, enabling damages to the magnetic head and the disk to be properly prevented.

DESCRIPTION OF THE PREFERRED EMBODIMENTS

Figure 1:
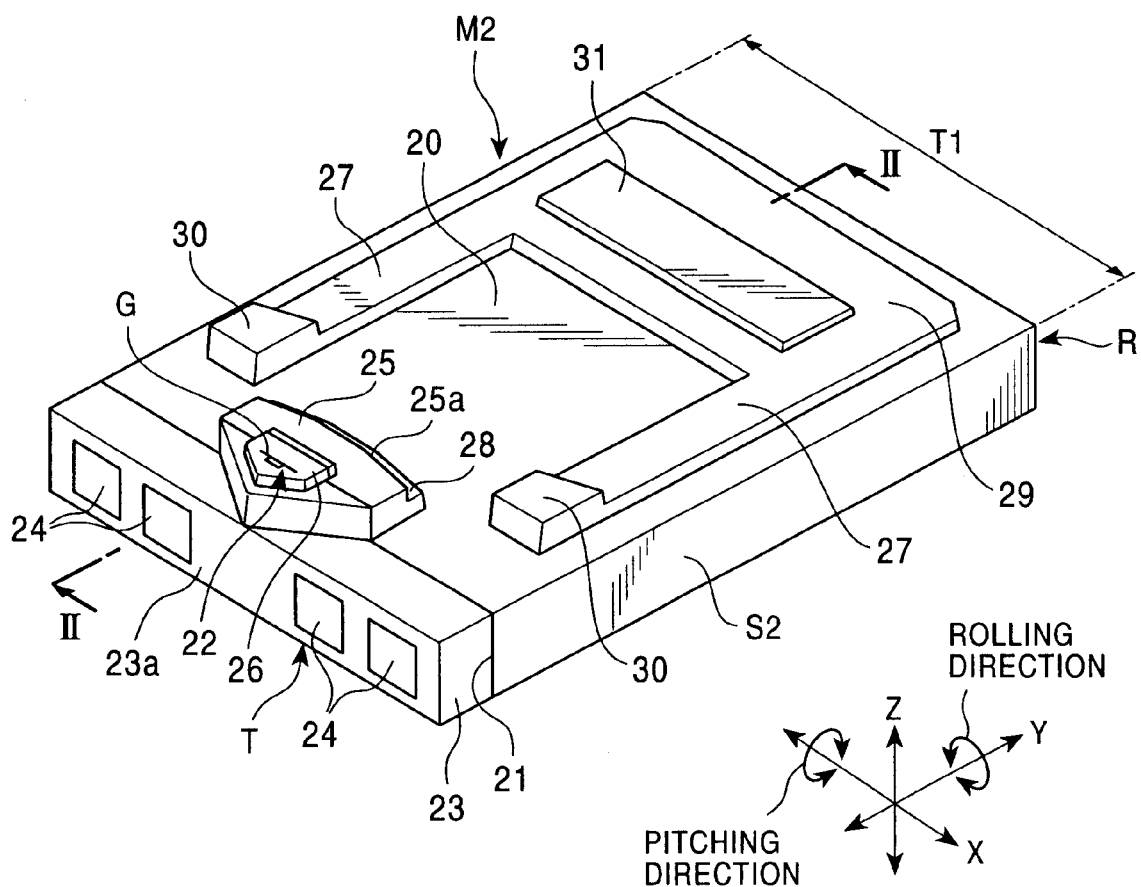
FIG. 1 is a perspective view of a magnetic head according to a first embodiment of the present invention when turning upward a surface facing a recording medium.
Figure 2:
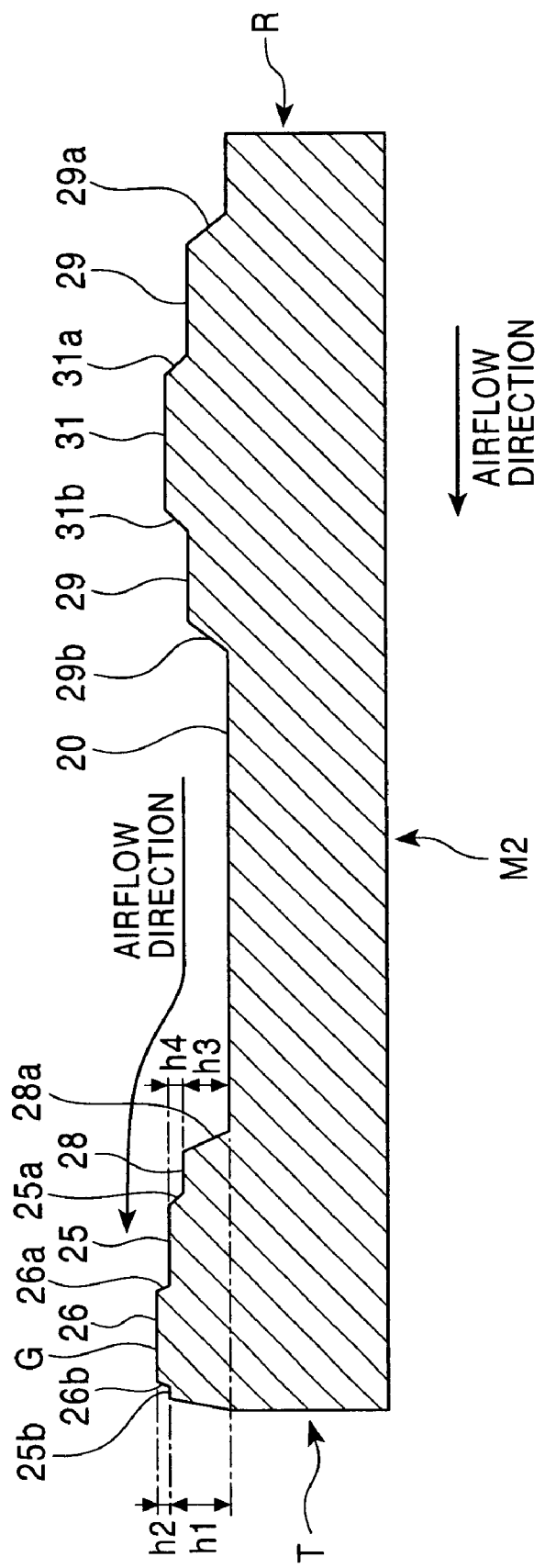
FIG. 2 is a sectional view of the magnetic head at the line of II—II in FIG. 1.

FIG. 1 is a perspective view of a magnetic head M2 according to an embodiment of the present invention when turning upward a surface 20 facing a recording medium; FIG. 2 is a sectional view of the magnetic head M2 at the line of II—II in FIG. 1 when viewing in an arrow direction.

A slider S2 is formed of a ceramic material such as alumina-titanium carbide ($Al_2O_3$—TiC). The dimension T1 in the width direction (X-direction in the drawing) is approximately 1 mm, for example.

As shown in FIG. 1, on an end-face 21 in the trailing side of the slider S2, a magnetic element 22 is formed, which comprises a thin-film recovery element, which is a recovery magnetic function part utilizing a magnetoresistive effect, and an inductive type thin-film recording element which is a recording magnetic function part. In the embodiment shown in FIG. 1, the magnetic element 22 is formed in the substantially central portion of the trailing end-face 21 of the slider S2. The magnetic element 22 is covered with a protecting layer 23 made of an insulating material such as $Al_2O_3$. On an end-face 23a in the trailing side of the protecting layer 23, terminals 24 are formed, which are electrically connected to the thin-film recovery element and the thin-film recording element forming the magnetic element 22, respectively.

As shown in FIG. 1, in the trailing side T of the slider S2, an ABS face 25 in the trailing side is formed so as to rise from a surface 20 facing a recording medium toward the recording medium (upward in the drawing).

According to the present invention, a surface 26 facing the element which exposes each gap part G of the thin-film recovery element and the thin-film recording element of the magnetic element 22 is formed so as to further rise from the ABS face 25 in the trailing side toward the recording medium.

Also, according to the present invention, as shown in FIG. 1, between a leading end-face 25a of the trailing ABS face 25 and the surface 20 facing the recording medium, a trailing step face 28 is formed which is lower than the trailing ABS face 25 by one step and rises from the surface 20 facing the recording medium.

The slider S2 shown in FIG. 1 is also provided with a leading step face 29 formed in the leading side R, which has the same height as that of the trailing step face 29 and rises from the surface 20 facing the recording medium. Furthermore, from both sides of the leading step face 29 in the lateral direction (X-direction in the drawing), two rail faces 27 and 27 having the same height as that of the step face 29 are formed so as to rise from the surface 20 facing the recording medium toward the trailing side T.

As shown in FIG. 1, from the respective trailing end-faces of the rail faces 27 and 27, side-ABS faces 30 and 30 are formed so as to rise from the surface 20 facing the recording medium toward the recording medium (upward in the drawing).

From the center of the leading step face 29, a leading ABS face 31 is further formed so as to rise toward the recording medium.

In addition, the side-ABS faces 30 and 30 and the leading ABS face 31 are the same in the height from the surface 20 facing the recording medium as that of the trailing ABS face 25.

Figure 12:
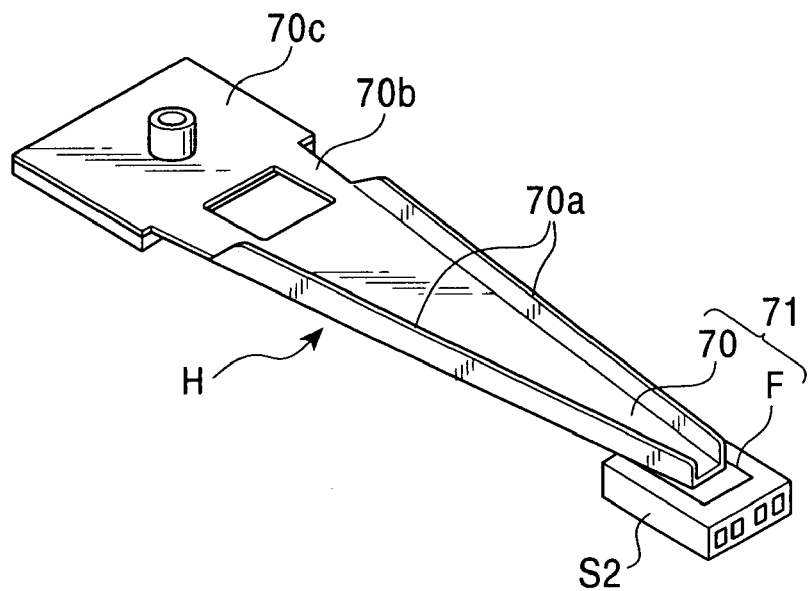
FIG. 12 is a perspective view of a magnetic head apparatus according to the present invention.
Figure 13:
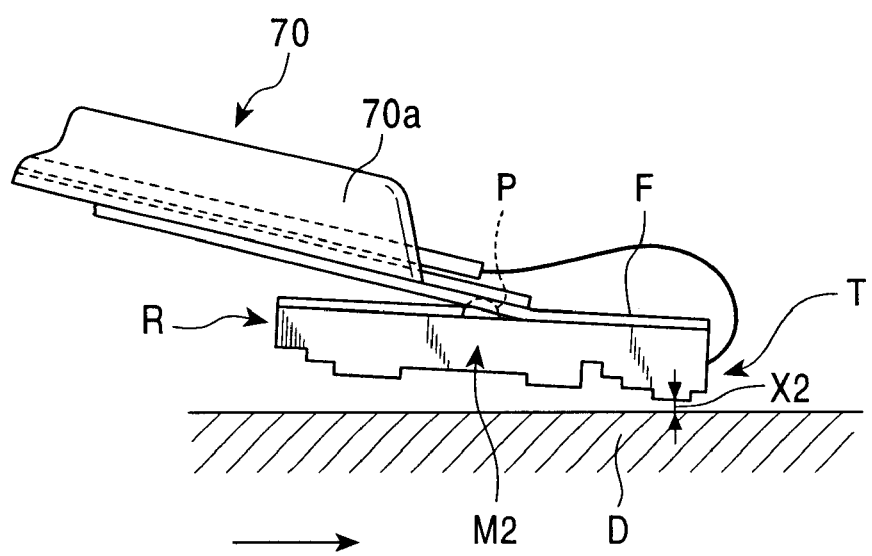
FIG. 13 is a partial side view showing a position of the magnetic head shown in FIG. 1 floating over a disk D.
Figure 14:
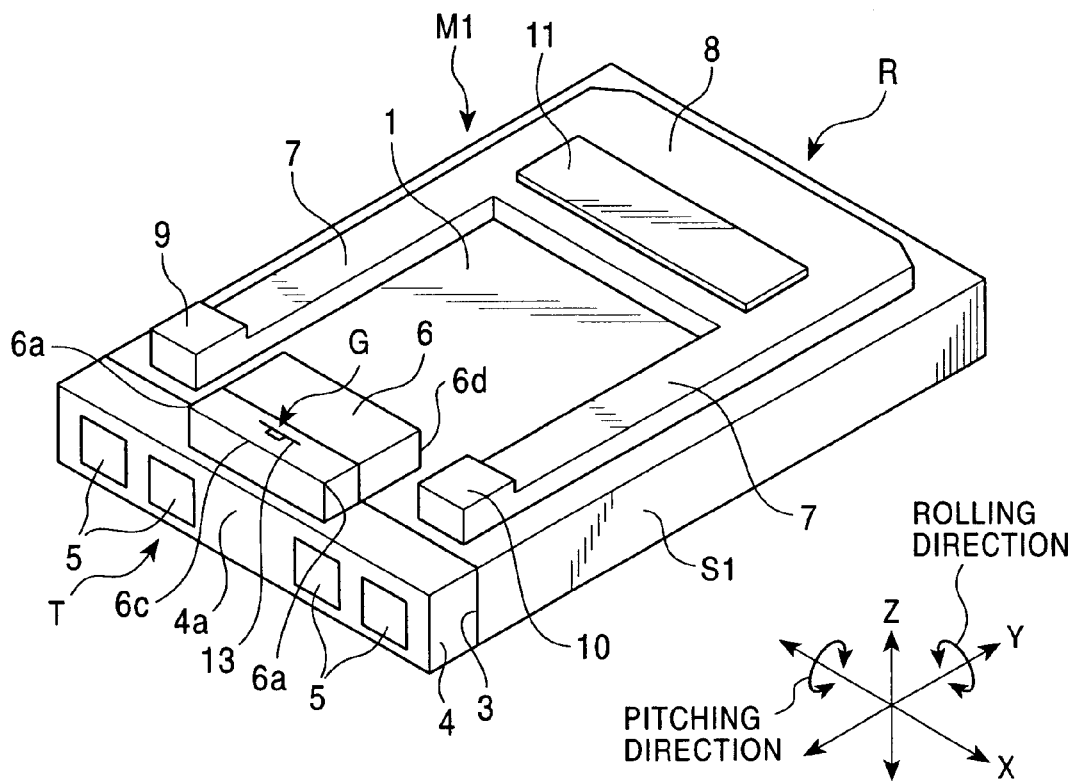
FIG. 14 is a perspective view of a conventional magnetic head.
Figure 15:
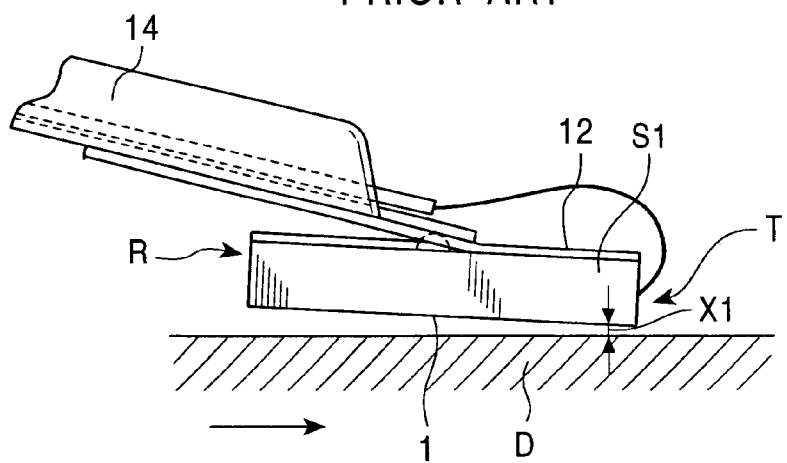
FIG. 15 is a partial side view showing a position of the magnetic head shown in FIG. 14 floating over a disk D.

FIG. 12 is a perspective view of a magnetic head apparatus H having the magnetic head M2 mounted thereon and shown in FIG. 1; FIG. 13 is a partial side view showing a position of the magnetic head M2 floating over a disk D.

As shown in FIG. 12, a supporting member 71 for supporting the magnetic head M2 comprises a load beam 70 which is a leaf spring and a flexor (elastic supporting member) F which is a thin leaf spring arranged at the end of the load beam 70.

As shown in FIG. 12, on both sides of the load beam 70, bent portions 70a and 70a are formed which have rigidity and can exhibit a predetermined elastic pressure in a base-end part 70b of the load beam 70 in which the bent portion 70a is not formed. From the base-end part 70b of the load beam 70, a mounting part 70c is also formed and the magnetic head apparatus H is mounted on a disk apparatus by attaching the mounting part 70c to a predetermined attaching surface of the disk apparatus.

As shown in FIGS. 12 and 13, on the bottom surface of the flexor F, the magnetic head M2 is fixed by adhesion from the opposite side of the surface 20 facing the recording medium. As shown in FIG. 13, the flexor F is provided with a spherical pivot P formed thereon so as to protrude upward in the drawing, and the end of the pivot P abuts the load beam 70.

The magnetic head M2 is urged to the recording surface of the disk D by the supporting member 71 with a weak elastic force. In the CSS system, the magnetic head M2 makes in contact with the disk D at the beginning. Due to airflow generated on the surface of the disk D simultaneously with starting of the disk D, a floating force is applied to the magnetic head M2 so as to float it in an inclined position that the leading-side of the magnetic head M2 is raised from the disk, so that the magnetic head M2 scans the surface of the disk D in a position that the trailing-side T of the magnetic head M2 is slightly floating on the disk D.

In addition, when the disk D rotates and airflow is led from the leading-side R of the magnetic head M2 toward the trailing-side T, positive pressure is generated on the ABS faces 25, 30, and 31 while negative pressure is generated on the surface 20 facing the recording medium surrounded by the rail faces 27 and the leading step face 29.

As shown in FIG. 13, symbol X2 represents the lift from the gap portion G of the magnetic element 22 to the disk surface when the magnetic head M2 is floating from the disk D.

In the magnetic head M2 according to the present invention, since the surface 26 facing the element which exposes the gap portion G of the magnetic element 22 is formed so as to rise from the trailing ABS face 25 toward the recording medium, the surface 26 facing the element protrudes from the surface 20 facing the recording medium to the highest level compared to those of other faces, as shown in FIG. 2.

Therefore, when the magnetic head M2 floats over the disk surface in a position in that the trailing-side T is lower than the leading-side R, as shown in FIG. 13, the gap portion G of the magnetic element 22 can be brought closer to the disk surface, enabling the lift X2 to be reduced.

The surface 26 facing the element can be formed to have an area including at least the gap portion G of the magnetic element 22. That is, because the surface area of the surface 26 facing the element can be sufficiently minimized to the extent including the gap portion G of the magnetic element 22, so that even when the lift X2 is reduced, collision between the surface 26 facing the element and the disk can be properly avoided, enabling damages to the magnetic head M2 and the disk D to be prevented.

As in the present invention, when the surface 26 facing the element is formed on the trailing ABS face 25 so as to rise therefrom, the height of the trailing ABS face 25 from the surface 20 facing the recording medium can be reduced by the raised height of the surface 26 facing the element in comparison with a conventional ABS face while a leading end face from the surface 20 facing the recording medium to the surface 26 facing the element can be formed via at least two steps.

Thereby, according to the present invention, airflow can be smoothly led from the surface 20 facing the recording medium, on which negative pressure generates, toward the trailing ABS face 25 and the surface 26 facing the element so that a predetermined positive pressure can be generated on the trailing ABS face 25 and the surface 26 facing the element. Therefore, according to the present invention, positive and negative pressures and an elastic force of the supporting member 71 can be well-balanced, enabling the floating position of the magnetic head M2 to be stabilized.

Also, according to the present invention, when the height from the surface 20 facing the recording medium to the trailing ABS face 25 is h1; the height from the trailing ABS face 25 to the surface 26 facing the element is h2, it is preferable that the ratio h2/h1 range from 0.4% to 2.5%. That is, the height from the trailing ABS face 25 to the surface 26 facing the element is extremely smaller compared to the height from the surface 20 facing the recording medium to the trailing ABS face 25. The positive pressure is generated not only on the trailing ABS face but also on the surface facing the element; however, when the height of the surface 26 facing the element raised from the trailing ABS face 25 is extremely small as mentioned above, the intensity of positive pressure generated on the trailing ABS face 25 is substantially maintained constant almost independently of the raised height of the surface 26 facing the element, and positive and negative pressures and the elastic force can be well-balanced, enabling the floating position of the magnetic head M2 to be stabilized.

In addition, according to the present invention, it is preferable that the height h3 from the surface 20 facing the recording medium to the step face 28 be approximately 2.0 μm; the height h4 from the step face 28 to the trailing ABS face 25 be approximately 0.2 μm; and the height h2 from the trailing ABS face 25 to the surface 26 facing the element be approximately from 0.01 μm to 0.03 μm.

In the embodiment according to the present invention shown in FIGS. 1 and 2, between the leading end face 25a of the trailing ABS face 25 and the surface 20 facing the recording medium, the trailing step face 28 having a height lower by one step level than that of the trailing ABS face 25 is formed so as to rise from the surface 20 facing the recording medium toward the disk surface. Thereby, as shown in FIG. 2, the leading face between the surface 20 facing the recording medium and the surface 26 facing the element is formed via three differences in level, so that the step face 28 serves as an introducing end for smoothly leading airflow toward the trailing ABS face 25 and the surface 26 facing the element.

Therefore, when the trailing step face 28 is formed, the airflow flowing between the magnetic head M2 and the disk D can be more smoothly led from the leading-side R to the trailing-side T, so that the intensity of positive pressure generated on the trailing ABS face 25 and the surface 26 facing the element can be more easily maintained within a predetermined value, and positive and negative pressures and the elastic force of the supporting member 71 can be well-balanced, enabling the floating position of the magnetic head M2 to be more stabilized.

Also, according to the present invention, as shown in FIG. 2, it is preferable that a leading end face 26a of the surface 26 facing the element and the leading end face 25a of the trailing ABS face 25 be inclined surfaces which gradually rise from the surface 20 facing the recording medium toward the surface 26 facing the element. A leading end face 28a of the trailing step face 28 also may be preferably an inclined surface which gradually rises from the surface 20 facing the recording medium toward the surface 26 facing the element.

When these leading end faces are surfaces inclined toward the surface 26 facing the element in such a manner, airflow is smoothly led from the surface 20 facing the recording medium along the trailing step face 28, the trailing ABS face 25, and the surface 26 facing the element, and positive and negative pressures and the elastic force can be more well-balanced, enabling the floating position to be furthermore stabilized. In addition, the leading end face may be formed so as to vertically rise from the surface 20 facing the recording medium.

In addition, according to the present invention, as shown in FIG. 2, it is preferable that a leading end face 31a of the leading ABS face 31 and a leading end face 29a of the leading step face 29 also be inclined surfaces which gradually rise from the surface 20 facing the recording medium toward the leading ABS face 31.

Furthermore, as shown in FIG. 2, it is preferable that a trailing end face 26b of the surface 26 facing the element and a trailing end face 25b of the trailing ABS face 25 be inclined surfaces which gradually rise from the surface 20 facing the recording medium toward the surface 26 facing the element. It is also preferable that a trailing end face 31b of the leading ABS face 31 and a trailing face 29b of the leading step face 29 be inclined surfaces which gradually rise from the surface 20 facing the recording medium toward the leading ABS face 31. Thereby, airflow can be more smoothly led from the leading-side R to the trailing-side T, enabling floating of the magnetic head M2 to be stabilized.

In addition, the above-mentioned inclined surface may also be preferably formed on a leading end face between the side-ABS face 30 and the rail face 27, and on a trailing end face between the side-ABS face 30 and the surface 20 facing the recording medium shown in FIG. 1.

As described above, according to the present invention, the surface 26 facing the element on which the gap portion G of the magnetic element 22 is located and formed so as to rise from the trailing ABS face 25 toward the recording medium, so that the lift X2 of the magnetic head M2 can be reduced while stability of the floating position is achieved, and even when the magnetic head M2 is inclined in the rolling or pitching direction, collision between the magnetic head M2 and the disk D can be readily avoided. In order to facilitate to avoid the collision moreover, there are improvements in shapes of trailing edges of the surface 26 facing the element and the trailing ABS face 25 according to the present invention.

Figure 3:
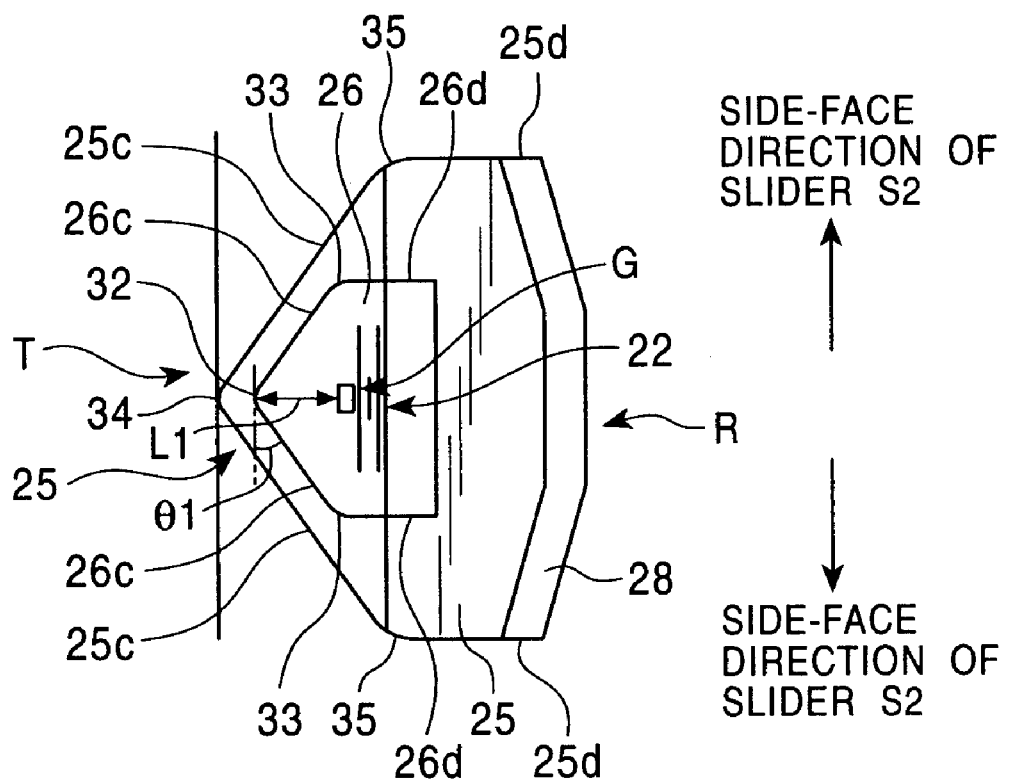
FIG. 3 is an enlarged plan view of a surface facing an element and an ABS face in the trailing side shown in FIG. 1.

FIG. 3 is a partial enlarged view of the surface 26 facing the element and the trailing ABS face 25 shown in FIG.

According to the present invention, as shown in FIGS. 1 and 3, side faces 26d of the surface 26 facing the element are provided with two inclined surfaces 26c and 26c which have an apex 32 formed at a trailing edge of the surface 26 facing the element and gradually approach both lateral side-faces of the slider S2 when proceeding toward the leading-side R, respectively. In addition, the apex 32 may be preferably formed in the lateral center of the surface 26 facing the element.

According to the present invention, when the side faces 26d of the surface 26 facing the element are provided with the two inclined surfaces 26c and 26c which gradually approach both lateral side-faces of the slider S2 when proceeding toward the leading-side R, respectively, when the magnetic head M2 is inclined in the rolling or pitching direction, collision between the trailing edge of the surface 26 facing the element and the disk surface can be more properly avoided, enabling damages to the magnetic head M2 and the disk D to be more properly restrained.

As shown in FIG. 3, the apex 32 may be preferably chamfered to have a curved surface. A corner 33 between the inclined surface 26c and the side face 26d may also be preferably chamfered to have a curved surface. Thereby, the apex 32 and the corner 33 are difficult to collide with the disk surface even when the magnetic head M2 is inclined in the rolling or pitching direction, or the impact can be relieved even when colliding provisionally, enabling damages to the magnetic head M2 and the disk D to be more properly restrained.

According to the present invention, it is also preferable that an inclination θ1 of the inclined surface 26c relative to the width direction of the slider S2 be 20° or more and 60° or less.

When the inclination θ1 is less than 20°, the inclined surface 26c or the corner 33 of the surface 26 facing the element is unfavorably liable to collide with the disk surface when the magnetic head M2 is inclined in the rolling or pitching direction.

On the other hand, when the inclination θ1 is more than 60°, the gap portion G of the magnetic element 22 is unfavorably difficult to be located inside the inclined surfaces 26c. This will be described below with reference to FIG. 4.

Figure 4:
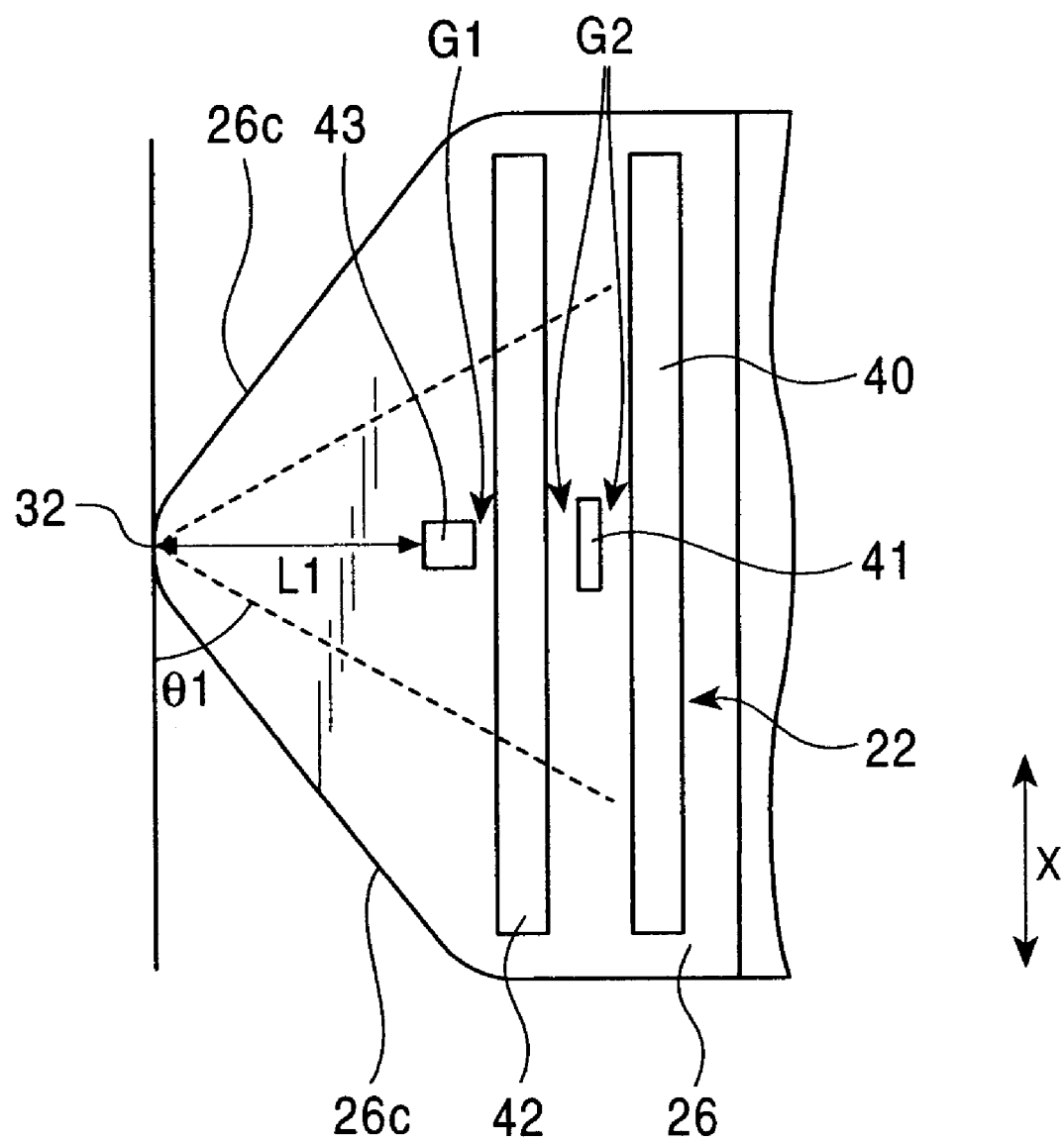
FIG. 4 is an enlarged plan view of the surface facing the element shown in FIG. 1.

FIG. 4 is a partial enlarged view of the surface 26 facing the element shown in FIG. 3. As shown in FIG. 4, on the surface 26 facing the element, a lower shielding layer 40 as a thin-film recovery element, a magnetoresistive-effect element 41, and an upper shielding layer 42 are exposed. Gap portions G2 are formed between the lower shielding layer 40 and the magnetoresistive-effect element 41, and between the magnetoresistive-effect element 41 and the upper shielding layer 42.

On the other hand, as a thin-film recording element, the upper shielding layer 42 is used also as a lower core layer and an upper core layer 43 is further exposed. Although not exposed on the surface 26 facing the element, a coil layer for inducing a recording magnetic field is formed in each of the core layers mentioned above. A gap portion G1 is formed between the lower core layer 42 and the upper core layer 43.

The distance between the upper core layer 43 of the magnetic element 22 and the apex 32 between the two inclined surfaces 26c and 26c is denoted as L1 and the distance L1 may be preferably 1.0 μm or less. The smaller the distance L1 is, the closer the gap portions G1 and G2 may preferably approach the disk D.

As shown in FIG. 4, the larger the inclination θ1 of the inclined surface 26c formed on the surface 26 facing the element relative to the width direction of the slider S2 (in the X-direction in the drawing), the more amount of the edges of the shielding layer and the core layer across the width (in the X-direction in the drawing) is cut off so that these parts come off the surface 26 facing the element. This tendency becomes furthermore noticeable with decreasing of the distance L1 between the upper core layer 43 of the magnetic element 22 and the apex 32 between the two inclined surfaces 26c and 26c; however, even when parts of edges of the shielding layer and the core layer come off, there is almost no effect on characteristics of the magnetic head.

However, when the inclination θ1 further increases so that parts of the gap portions G1 and G2 of the magnetic element 22 are also cut off and the gap portions G1 and G2 come off the surface 26 facing the element, the gap portions G1 and G2 cut in such a manner are exposed on the trailing ABS face 25 which is lower by one step than the surface 26 facing the element. Thereby, the gap portions G1 and G2 become more distant from the disk surface so as to unfavorably degrade writing and reading characteristics. This tendency becomes noticeable when the inclination angles θ1 of the two inclined surfaces 26c exceed 60°. Thus, the inclination θ1 of the inclined surface 26c is set at 60° at most according to the present invention.

According to the present invention, as shown in FIG. 3, it is preferable that side faces 25d of the trailing ABS face 25 be also provided with two inclined surfaces 25c and 25c which have an apex 34 formed at a trailing edge of the trailing ABS face 25 and gradually approach both lateral side-faces of the slider S2 when proceeding toward the leading-side R, respectively. Thereby, the trailing edge 25b of the trailing ABS face 25 can be avoided to collide with the disk surface even when the magnetic head M2 is inclined in the rolling or pitching direction.

The apex 34 and a corner 35 between the trailing edge 25b and the side face 25d may be preferably chamfered to have a curved surface.

Figure 5:
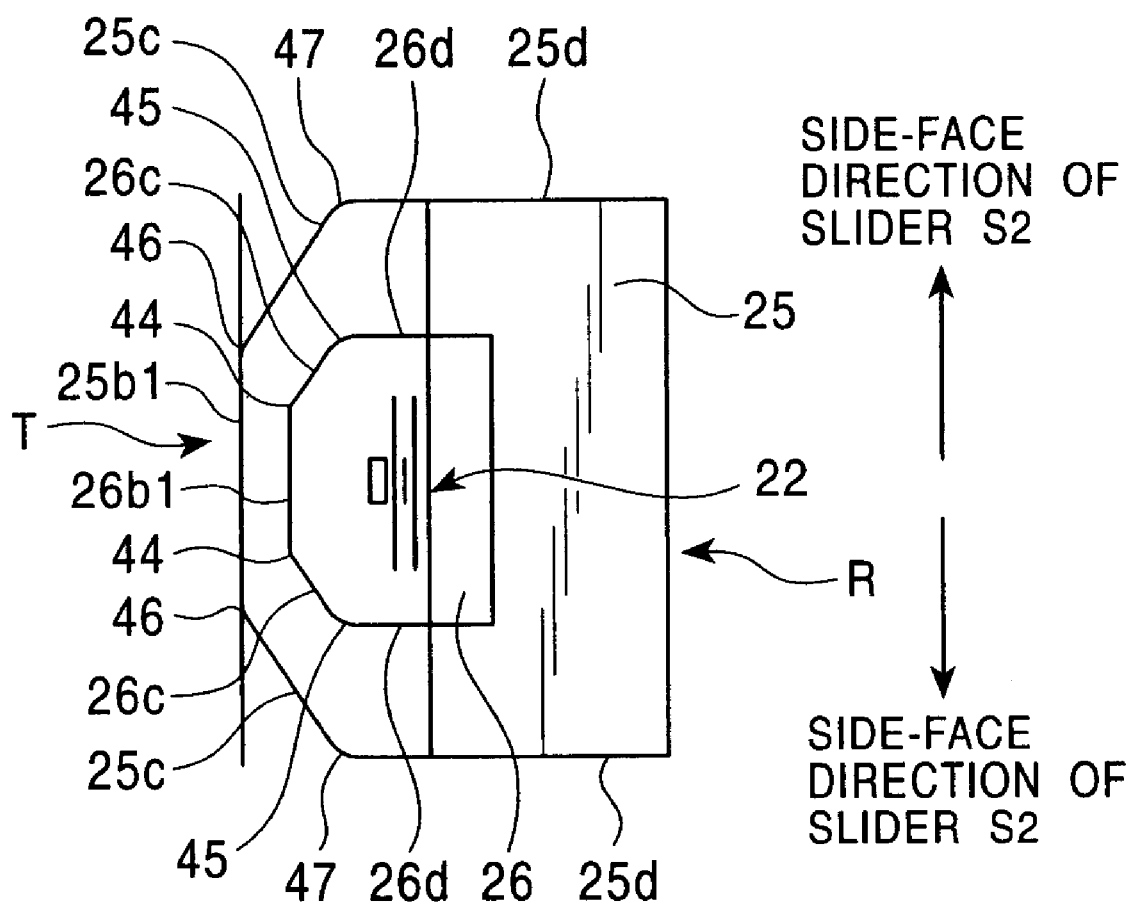
FIG. 5 is an enlarged plan view of a surface facing an element and an ABS face in the trailing side according to another embodiment of the present invention.

Next, FIG. 5 is a plan view of another embodiment in which only the surface 26 facing the element and the trailing ABS face 25 are enlarged.

In FIG. 5, on the side faces 26d of the surface 26 facing the element, the two inclined surfaces 26c and 26c are provided which start a trailing edge 26b1 of the surface 26 facing the element and gradually approach side-faces of the slider when proceeding toward the leading-side R, respectively, and the trailing-side T of the surface 26 facing the element is formed of the trailing side face extending in the lateral direction of the slider S2 and the two inclined surfaces 26c and 26c. In this case also, even when the magnetic head M2 is inclined in the rolling or pitching direction, the surface 26 facing the element is difficult to collide with the disk surface, enabling damages to the magnetic head M2 and the disk D to be more properly restrained. Corners 44 and 45 formed in the trailing-side of the surface 26 facing the element may be preferably chamfered to have curved surfaces.

Furthermore, on the side faces 25d of the trailing ABS face 25, two inclined surfaces 25c and 25c may be provided which start a trailing edge 25b1 of the trailing ABS face 25 and gradually approach side-faces of the slider S2 when proceeding toward the leading-side R, respectively, and the trailing-side T of the trailing ABS face 25 may be formed of the trailing end 25b extending in the lateral direction of the slider S2 and the two inclined surfaces 25c and 25c. Moreover, corners 46 and 47 formed in the trailing-side T of the trailing ABS face 25 may be preferably chamfered to have curved surfaces. Thereby, even when the magnetic head M2 is inclined in the rolling or pitching direction, the trailing ABS face 25 is difficult to collide with the disk surface, or the impact can be relieved even when colliding provisionally, enabling damages to the magnetic head M2 and the disk D to be more properly restrained.

Figure 6:
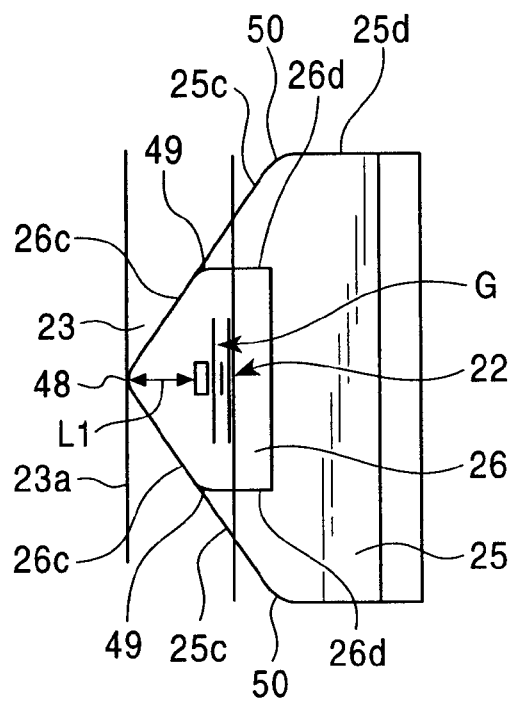
FIG. 6 is an enlarged plan view of a surface facing an element and an ABS face in the trailing side according to another embodiment of the present invention.

FIG. 6 is a partial plan view of the surface 26 facing the element and the trailing ABS face 25 according to another embodiment of the present invention.

In FIG. 6, the inclined surface 26c formed on the surface 26 facing the element and the inclined surface 25c formed on the trailing ABS face 25 are continuous. Any of the apex 48 of the inclined surfaces 26c and 25c, and corners 48, 49, and 50 between the inclined surfaces 26c and 25c and the side faces 26d and 25d may be preferably chamfered to have a curved surface.

In this embodiment, it is preferable that the distance L1 between the upper core layer 43 of the magnetic element 22 located within the surface 26 facing the element (see FIG. 4) and the apex 48 of the two inclined surfaces 26c and 26c be 1.0 μm at most. In order to reduce the distance L1 to 1.0 μm or less, it is sufficient that the distance from the trailing end face 23a of the protecting layer 23 covering the magnetic element 22 to the upper core layer 43 of the magnetic element 22 be 1.0 μm or less.

In the embodiment, the inclined surfaces 26d and 25d formed on the surface 26 facing the element and the trailing ABS face 25 can be readily formed while the gap portion G of the magnetic element 22 can be moved closer to the disk surface so as to reduce a lift X2 between the magnetic head M2 and the disk D, preferably enabling reduction of the lift in future to be corresponded.

Figure 7:
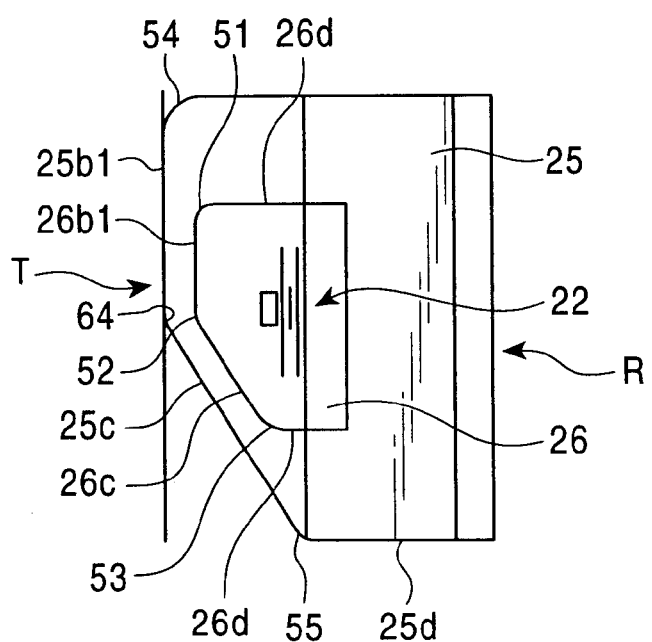
FIG. 7 is an enlarged plan view of a surface facing an element and an ABS face in the trailing side according to another embodiment of the present invention.

FIG. 7 is a partial-enlarged plan view of the surface 26 facing the element and the trailing ABS face 25 according to another embodiment of the present invention.

In FIG. 7, on the side face 26d of the surface 26 facing the element, one inclined surface 26c is formed which starts the trailing edge 26b1 of the surface 26 facing the element and gradually approaches a side-face of the slider S2 when proceeding toward the leading-side R. Similarly, on the side face 25d of the trailing ABS face 25, one inclined surface 25c is formed which starts the trailing edge 25b1 of the trailing ABS face 25 and gradually approaches a side-face of the slider S2 when proceeding toward the leading-side R. It is preferable that both the inclined surfaces 26c and 25c be rather formed on a side face in the same side.

As shown in FIG. 7, even when the surface 26 facing the element and the trailing ABS face 25 have each only one of the respective inclined surfaces 26c and 25c, collision of the disk D with the surface 26 facing the element and the trailing ABS face 25 when the magnetic head M2 is inclined in a rolling or pitting direction can be avoided more effectively compared with a conventional apparatus, enabling damages to the magnetic head M2 and the disk D to be prevented.

As shown in FIG. 7, any of corners 51, 52, and 53 formed in the trailing-side T of a disk surface 26 and corners 54, 55, and 64 formed in the trailing-side T of the trailing ABS face 25 may be preferably chamfered to have a curved surface. Thereby, the corners can be avoided to collide with the disk D, or the impact can be relieved even when colliding provisionally, enabling damages to the magnetic head M2 and the disk D to be prevented.

Figure 8:
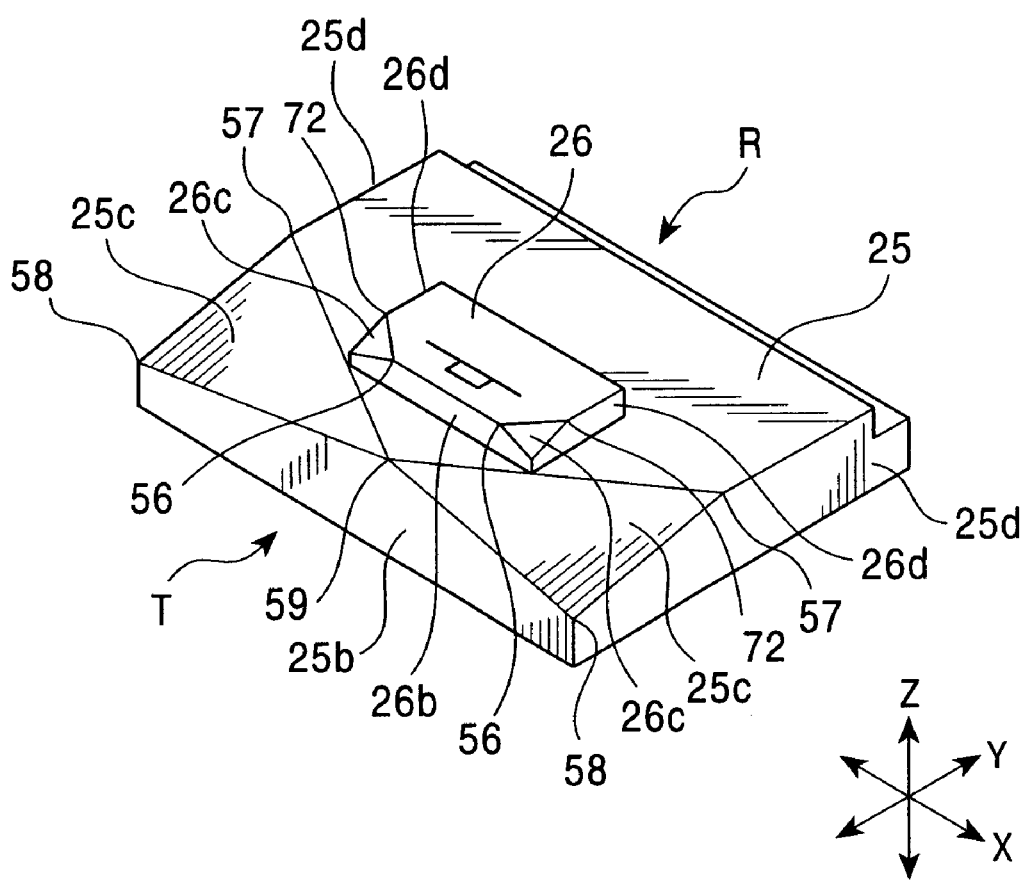
FIG. 8 is an enlarged perspective view of a surface facing an element and an ABS face in the trailing side according to another embodiment of the present invention.

FIG. 8 is a partial schematic view showing enlarged parts of a surface facing the element and a trailing ABS face according to another embodiment of the present invention.

In the embodiment shown in FIG. 8, the inclined surfaces 26c and 25c formed on the surface 26 facing the element and the trailing ABS face 25 are obliquely chamfered from the Z-direction in the drawing.

Although the inclined surface 26c formed on the surface 26 facing the element and the inclined surface 25c formed on the trailing ABS face 25 are formed only until intermediate portions of the trailing end faces 26b and 25b and the side faces 26d and 26d of the surface 26 facing the element in the embodiment, the magnetic head M2 can be therefore avoided to collide with the disk D when the magnetic head M2 is inclined in a rolling or pitting direction, enabling damages to the magnetic head M2 and the disk D to be prevented.

According to the present invention, any of corners 72 and 56 formed in the trailing-side T of the surface 26 facing the element and corners 57, 58, and 59 formed in the trailing-side T of the trailing ABS face 25 may be preferably chamfered to have a curved shape.

Figure 9:
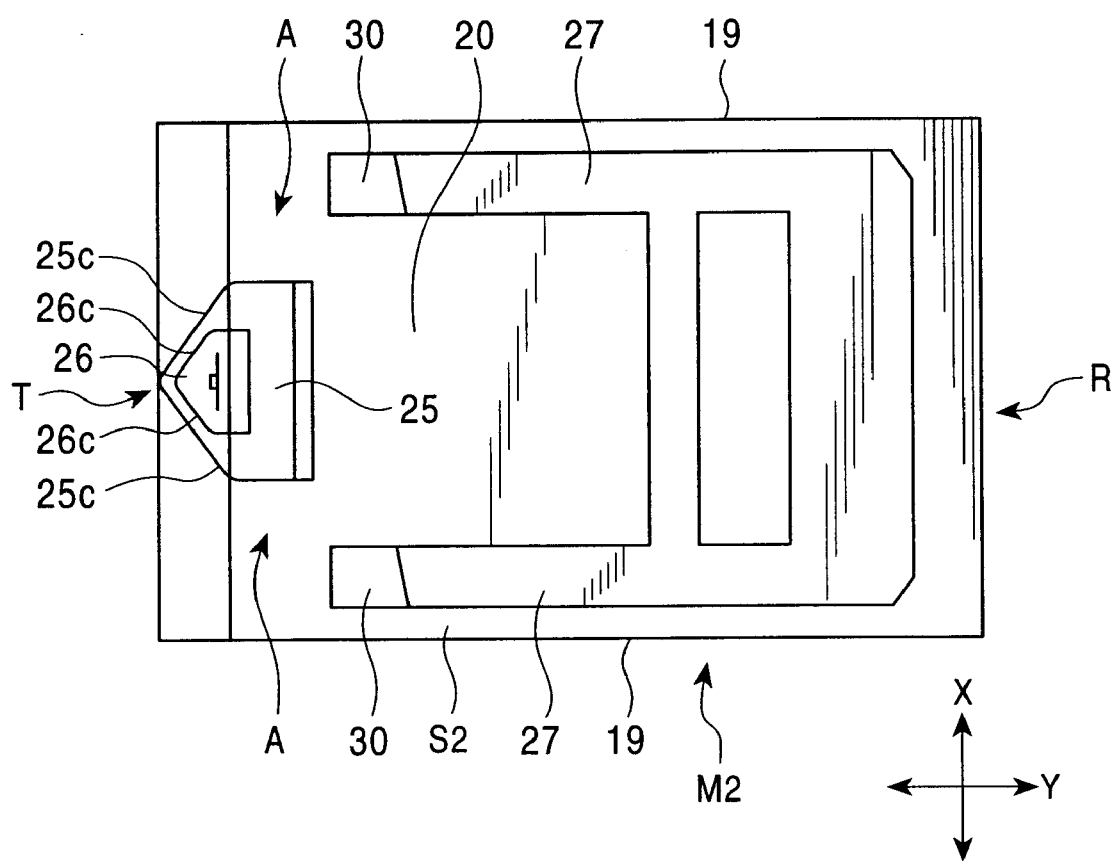
FIG. 9 is a plan view of the magnetic head shown in FIG.

FIG. 9 is a plan view of the magnetic head according to the present invention illustrating the entire structure thereof.

According to the present invention, as shown in FIG. 9, the surface 20 facing the recording medium is formed to extend between the trailing ABS face 25 having the surface 26 facing the element formed thereon and both side-faces 19 and 19 of the slider S2. That is, in bilateral regions A and A between the trailing ABS face 25 and the both side-faces 19 and 19 of the slider S2, only the surface 20 facing the recording medium is formed, and the side ABS faces 30 raised from the surface 20 facing the recording medium and the rail faces 27 are not formed to extend into the bilateral regions A.

Thereby, even when the magnetic head M2 is inclined especially in a rolling direction (X-direction in the drawing), because the bilateral regions A and A of the magnetic head M2 become distant from the disk surface, the bilateral regions A and A are difficult to collide with the disk D, enabling damages to the magnetic head M2 and the disk D to be prevented.

As shown in FIG. 9, when the surface 26 facing the element and the trailing ABS face 25 have the respective two inclined surfaces 26c and 25c, it is preferable that the surface 26 facing the element and the trailing ABS face 25 be formed at the lateral center of the magnetic head M2 in the trailing side T. At this time, even when the magnetic head M2 is inclined in the rolling or pitching direction, collision of the disk D with the surface 26 facing the element and the trailing ABS face 25 can be properly avoided, enabling damages to the magnetic head M2 and the disk D to be prevented.

Figure 10:
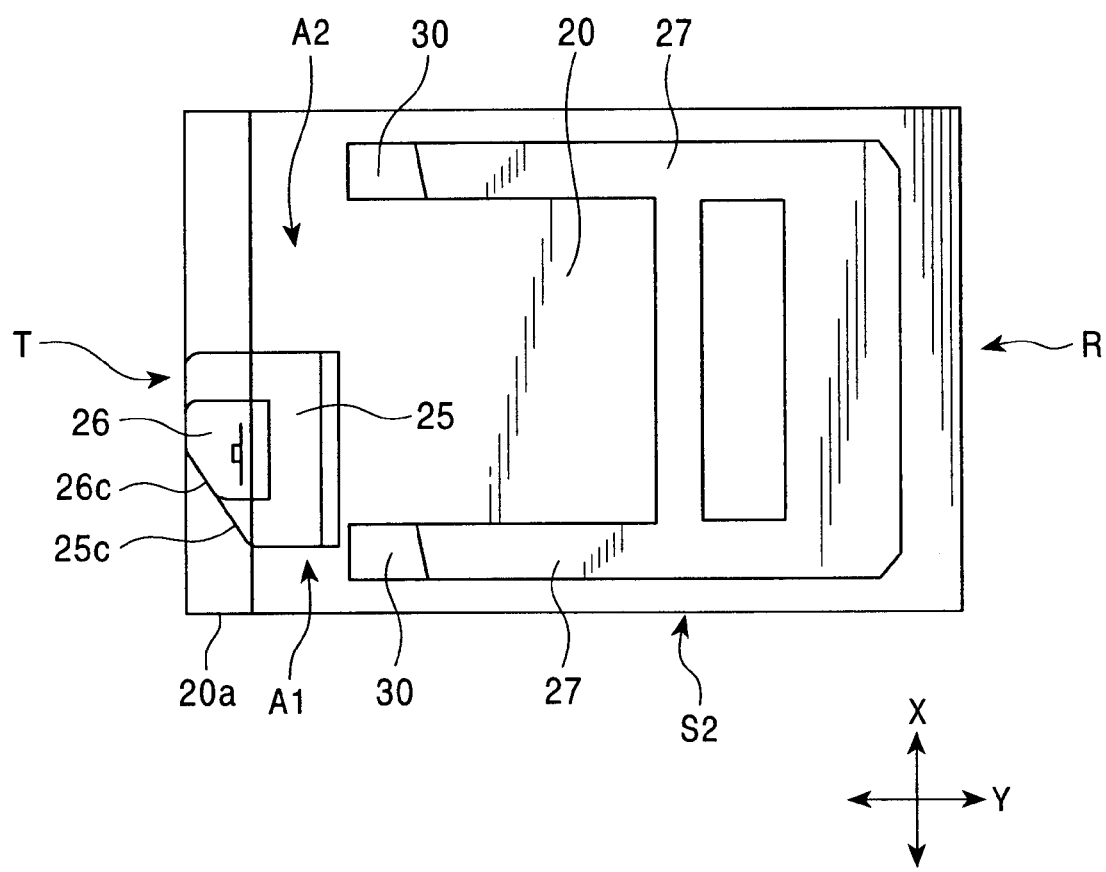
FIG. 10 is a plan view of a magnetic head according to another embodiment of the present invention.

FIG. 10 is a plan view of a magnetic head M2 according to another embodiment of the present invention illustrating the entire structure thereof.

In this embodiment, in the same way as in FIG. 9, the surface 20 facing the recording medium extends into bilateral regions A1 and A2 between the trailing ABS face 25 and both side-faces 19 and 19 of the slider S2, while the rail faces 27 raised from the surface 20 facing the recording medium and the ABS faces 30 and 30 formed integrally with the rail faces 27 are not formed to extend until the bilateral regions A1 and A2. Accordingly, even when the magnetic head M2 is inclined over the disk surface especially in a rolling direction, the bilateral regions A1 and A2 can be avoided to collide with the disk surface, enabling damages of the magnetic head M2 and the disk D to be prevented.

In this embodiment, the surface 26 facing the element and the trailing ABS face 25 also have each one of the respective inclined surfaces 26c and 25c. In this case, it is preferable that the trailing ABS face 25 and the surface 26 facing the element be rather formed off-center in the bilateral direction of the slider S2 so that the side faces having the inclined surfaces 26c and 25c formed thereon approach the side face 19 of the slider S2 closer thereto than the side faces not having the inclined surfaces 26c and 25c.

In the embodiment, even when the magnetic head M2 is inclined in the rolling direction so that the bilateral region A1 in the trailing-side T approaches the disk D, collision between the magnetic head M2 and the disk surface can be properly avoided because the surface 26 facing the element and the trailing ABS face 25 have the inclined surfaces 26c and 25c.

Figure 11:
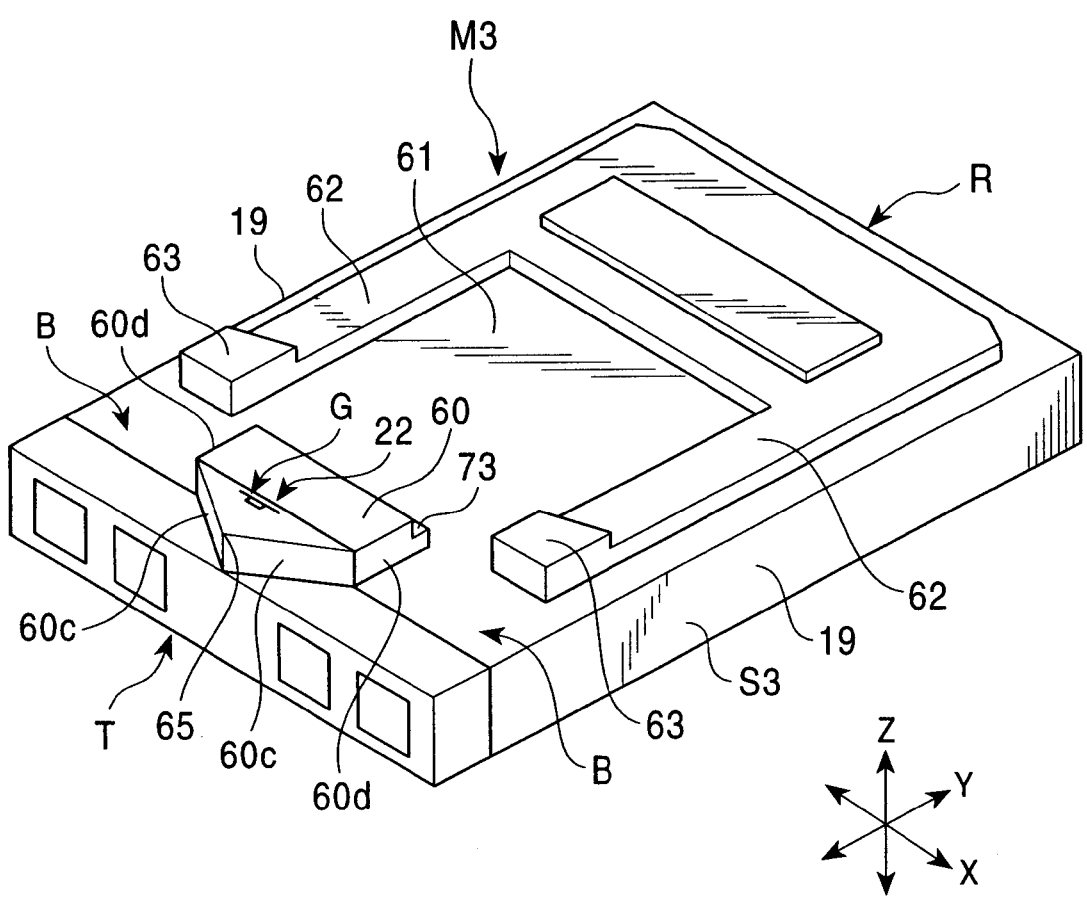
FIG. 11 is a plan view of a magnetic head according to another embodiment of the present invention.

FIG. 11 is a perspective view illustrating a structure of a magnetic head M3 according to another embodiment of the present invention. When comparing with the magnetic head M2 shown in FIG. 1, only the structure of a surface 60 facing an element is different and other structures are the same as those in FIG. 1.

In the magnetic head M3 shown in FIG. 11, the gap portion G of the magnetic element 22 is exposed on the surface 60 facing the element formed to rise from a surface 61 facing a recording medium.

In FIG. 11, on side faces 60d of the surface 60 facing the element, two inclined surfaces 60c and 60c are formed so as to have an apex 65 formed at a trailing edge 60a and gradually approach both lateral side-faces 19 of a slider S3 when proceeding toward the leading-side R, respectively, Furthermore, according to the present invention, as shown in FIG. 11, the surface 61 facing the recording medium extends into bilateral regions B and B between the surface 60 facing the element and both side-faces 19 of the slider S3, while rail faces 62 and side ABS-faces 63 raised from the surface 61 facing the recording medium are not formed to extend until the bilateral regions B and B.

Therefore, in the magnetic head M3 shown in FIG. 11, even when the magnetic head M3 is inclined in the rolling or pitching direction, collision of the disk surface with the surface 60 facing the element and the bilateral regions B of the magnetic head M3 can be properly avoided, enabling damages to the magnetic head M3 and the disk D to be properly prevented.

In addition, according to the present invention, on the side face 60d of the surface 60 facing the element, one inclined surface 60c may be formed so as to start from the trailing edge of the surface 60 facing the element and gradually approach the side-face 19 of the slider S3 when proceeding toward the leading-side R. It is also preferable that the inclined surface have an inclination ranging from 20° to 60° relative to the lateral direction of the slider S3.

Also, according to the present invention, it is preferable that other faces other than the surface 60 facing the element be formed to rise from the surface 61 facing the recording medium, and the surface 60 facing the element be located at the position closest to the recording medium. For example, a concrete example can be shown such as that a trailing ABS face is formed to rise from the surface 61 facing the recording medium and the surface 60 facing the element is further formed to rise from the trailing ABS face in the same way as in FIG. 1.

It is further preferable that a step face 73 having a height lower by one step than that of the surface 60 facing the element be formed between a leading edge of the surface 60 facing the element and the surface 61 facing the recording medium so as to rise from the surface 61 facing the recording medium, as shown in FIG. 11.

In addition, the magnetic head apparatus according to the present invention shown in FIG. 12 can be applied to a ramp load system as well as the CSS system.

What is claimed is:

1. A magnetic head comprising:

a slider; and a magnetic element disposed on an end face of the slider in the trailing side for writing and/or reading, wherein a plurality of ABS faces are formed on a surface of the slider facing a recording medium so as to rise toward the recording medium and be at the same level as each other, the plurality of ABS faces serving to generate positive pressure, wherein a surface having the element is formed on the ABS face in the trailing side so as to further rise toward the recording medium, and a gap portion of the magnetic element is located on the surface having the element, wherein a leading end face of the trailing ABS face and a leading end face of the surface having the element are inclined surfaces that are sloped relative to a depth of the slider and which gradually rise from the surface facing the recording medium toward the surface having the element, and wherein when the height from the surface facing the recording medium to the trailing ABS face is h1 and the height from the trailing ABS face to the surface having the element is h2, the ratio h2/h1 is at least 0.4% and 2.5% at most.

2. A magnetic head according to claim 1, wherein the surface facing the recording medium extends between the ABS faces and both side faces of the slider.

3. A magnetic head apparatus comprising:

a magnetic head according to claim 1; and a supporting member for elastically supporting the magnetic head from the side opposite to the surface facing the recording medium.

4. A magnetic head according to claim 1, wherein a side face of the surface having the element is provided with an angled surface formed thereon which is angled relative to a width direction of the slider and which starts from a trailing edge of the surface having the element and gradually approaches a side face of the slider when proceeding toward the leading side, and wherein a gap portion of the magnetic element is located in the vicinity of the angled surface.

5. A magnetic head according to claim 4, wherein the surface having the element is provided with two angled surfaces at both sides thereof, each angled surface being angled relative to a width direction of the slider and starting from the trailing edge and gradually approaching the corresponding side face of the slider when proceeding toward the leading side, and the gap portion of the magnetic element is located between the two angled surfaces.

6. A magnetic head according to claim 4, wherein two of the angled surfaces are provided so as to have an apex formed at the trailing edge and gradually approach both lateral side-faces of the slider when proceeding toward the leading-side, respectively, and wherein a gap portion of the magnetic element is located at a position sandwiched between the two angled surfaces.

7. A magnetic head according to claim 6, wherein an inclination θ1 of the angled surfaces relative to the width direction of the slider is at least 20° and 60° at most.

8. A magnetic head according to claim 6, wherein the apex has a curved surface.

9. A magnetic head according to claim 1, wherein both side faces of the surface having the element and the trailing ABS face are provided with respective angled surfaces formed thereon which are angled relative to a width direction of the slider and which start from respective trailing edges of the surface having the element and the trailing ABS face and gradually approach a side face of the slider when proceeding toward the leading side, and wherein a gap portion of the magnetic element is located in the vicinity of the angled surfaces.

10. A magnetic head according to claim 9, wherein the angled surface of the surface having the element and the angled surface of the trailing ABS face are continuous.

11. A magnetic head according to claim 9, wherein each of the surface having the element and the trailing ABS face is provided with two angled surfaces at both sides thereof, each of the angled surfaces of the surface having the element and the trailing ABS face being angled relative to a width direction of the slider and starting from the trailing edge and gradually approaching the corresponding side face of the slider when proceeding toward the leading side, and the gap portion of the magnetic element is located between the two angled surfaces of the surface having the element and the trailing ABS face.

12. A magnetic head according to claim 1, wherein between a leading edge of the trailing ABS face and the surface facing the recording medium, a step face having a height lower than that of the ABS face is formed.

13. A magnetic head comprising:
a slider; and
a magnetic element disposed on an end face of the slider in the trailing side for writing and/or reading,
wherein a plurality of ABS faces are formed on a surface of the slider facing a recording medium so as to rise toward the recording medium and be at the same level as each other, the plurality of ABS faces serving to generate positive pressure,
wherein a surface having the element is formed on the ABS face in the trailing side so as to further rise toward the recording medium, and a gap portion of the magnetic element is located on the surface having the element,
wherein a leading end face of the trailing ABS face and a leading end face of the surface having the element are inclined surfaces that are sloped relative to a depth of the slider and which gradually rise from the surface facing the recording medium toward the surface having the element, and
wherein between a leading edge of the trailing ABS face and the surface facing the recording medium, a step face having a height lower than that of the ABS face is formed.

14. A magnetic head according to claim 13, wherein a side face of the surface having the element is provided with an angled surface formed thereon which is angled relative to a width direction of the slider and which starts from a trailing edge of the surface having the element and gradually approaches a side face of the slider when proceeding toward the leading side, and wherein a gap portion of the magnetic element is located in the vicinity of the angled surface.

15. A magnetic head according to claim 14, wherein two of the angled surfaces are provided so as to have an apex formed at the trailing edge and gradually approach both lateral side-faces of the slider when proceeding toward the leading-side, respectively, and wherein a gap portion of the magnetic element is located at a position sandwiched between the two angled surfaces.

16. A magnetic head according to claim 15, wherein an inclination θ1 of the angled surfaces relative to the width direction of the slider is at least 20° and 60° at most.

17. A magnetic head according to claim 15, wherein the apex has a curved surface.

18. A magnetic head according to claim 14, wherein the surface having the element is provided with two angled surfaces at both sides thereof, each angled surface being angled relative to a width direction of the slider and starting from the trailing edge and gradually approaching the corresponding side face of the slider when proceeding toward the leading side, and the gap portion of the magnetic element is located between the two angled surfaces.

19. A magnetic head according to claim 13, wherein both side faces of the surface having the element and the trailing ABS face are provided with respective angled surfaces formed thereon which are angled relative to a width direction of the slider and which start from respective trailing edges of the surface having the element and the trailing ABS face and gradually approach a side face of the slider when proceeding toward the leading side, and wherein a gap portion of the magnetic element is located in the vicinity of the angled surfaces.

20. A magnetic head according to claim 19, wherein the angled surface of the surface having the element and the angled surface of the trailing ABS face are continuous.

21. A magnetic head according to claim 19, wherein each of the surface having the element and the trailing ABS face is provided with two angled surfaces at both sides thereof, each of the angled surfaces of the surface having the element and the trailing ABS face being angled relative to a width direction of the slider and starting from the trailing edge and gradually approaching the corresponding side face of the slider when proceeding toward the leading side, and the gap portion of the magnetic element is located between the two angled surfaces of the surface having the element and the trailing ABS face.

22. A magnetic head according to claim 13, wherein the surface facing the recording medium extends between the ABS faces and both side faces of the slider.

23. A magnetic head comprising:
a magnetic head according to claim 13; and
a supporting member for elastically supporting the magnetic head from the side opposite to the surface facing the recording medium.

24. A magnetic head comprising:
a slider; and
a magnetic element disposed on an end face of the slider in the trailing side for writing and/or reading,
wherein a plurality of ABS faces are formed on a surface of the slider facing a recording medium so as to rise toward the recording medium and be at the same level as each other, the plurality of ABS faces serving to generate positive pressure,
wherein a surface having the element is formed on the ABS face in the trailing side so as to further rise toward the recording medium, and a gap portion of the magnetic element is located on the surface having the element,
wherein a side face of the surface having the element is provided with an angled surface formed thereon which is angled relative to a width direction of the slider and which starts from a trailing edge of the surface having the element and gradually approaches a side face of the slider when proceeding toward the leading side, and wherein a gap portion of the magnetic element is located in the vicinity of the angled surface, and
wherein when the height from the surface facing the recording medium to the trailing ABS face is h1 and the height from the trailing ABS face to the surface having the element is h2, the ratio h2/h1 is at least 0.4% and 2.5% at most.

25. A magnetic head according to claim 24, wherein the surface facing the recording medium extends between the ABS faces and both side faces of the slider.

26. A magnetic head apparatus comprising:
a magnetic head according to claim 24; and
a supporting member for elastically supporting the magnetic head from the side opposite to the surface facing the recording medium.

27. A magnetic head according to claim 24, wherein the surface having the element is provided with two angled surfaces at both sides thereof, each angled surface being angled relative to a width direction of the slider and starting from the trailing edge and gradually approaching the corresponding side face of the slider when proceeding toward the leading side, and the gap portion of the magnetic element is located between the two angled surfaces.

28. A magnetic head according to claim 24, wherein between a leading edge of the trailing ABS face and the surface facing the recording medium, a step face having a height lower than that of the ABS face is formed.

29. A magnetic head according to claim 24, wherein two of the angled surfaces are provided so as to have an apex formed at the trailing edge and gradually approach both lateral side-faces of the slider when proceeding toward the leading-side, respectively, and wherein a gap portion of the magnetic element is located at a position sandwiched between the two angled surfaces.

30. A magnetic head according to claim 29, wherein an inclination θ1 of the angled surfaces relative to the width direction of the slider is at least 20° and 60° at most.

31. A magnetic head according to claim 29, wherein the apex has a curved surface.

32. A magnetic head comprising:
a slider; and
a magnetic element disposed on an end face of the slider in the trailing side for writing and/or reading,
wherein a plurality of ABS faces are formed on a surface of the slider facing a recording medium so as to rise toward the recording medium and be at the same level as each other, the plurality of ABS faces serving to generate positive pressure,
wherein a surface having the element is formed on the ABS face in the trailing side so as to further rise toward the recording medium, and a gap portion of the magnetic element is located on the surface having the element,
wherein both side faces of the surface having the element and the trailing ABS face are provided with respective angled surfaces formed thereon which are angled relative to a width direction of the slider and which start from respective trailing edges of the surface having the element and the trailing ABS face and gradually approach a side face of the slider when proceeding toward the leading side, and wherein a gap portion of the magnetic element is located in the vicinity of the angled surfaces, and
wherein when the height from the surface facing the recording medium to the trailing ABS face is h1 and the height from the trailing ABS face to the surface having the element is h2, the ratio h2/h1 is at least 0.4% and 2.5% at most.

33. A magnetic head according to claim 32, wherein the angled surface of the surface having the element and the angled surface of the trailing ABS face are continuous.

34. A magnetic head according to claim 32, wherein the surface facing the recording medium extends between the ABS faces and both side faces of the slider.

35. A magnetic head apparatus comprising:
a magnetic head according to claim 32; and
a supporting member for elastically supporting the magnetic head from the side opposite to the surface facing the recording medium.

36. A magnetic head according to claim 32, wherein each of the surface having the element and the trailing ABS face is provided with two angled surfaces at both sides thereof, each of the angled surfaces of the surface having the element and the trailing ABS face being angled relative to a width direction of the slider and starting from the trailing edge and gradually approaching the corresponding side face of the slider when proceeding toward the leading side, and the gap portion of the magnetic element is located between the two angled surfaces of the surface having the element and the trailing ABS face.

37. A magnetic head according to claim 32, wherein between a leading edge of the trailing ABS face and the surface facing the recording medium, a step face having a height lower than that of the ABS face is formed.

38. A magnetic head comprising:
a slider; and
a magnetic element disposed on an end face of the slider in the trailing side for writing and/or reading,
wherein a plurality of ABS faces are formed on a surface of the slider facing a recording medium so as to rise toward the recording medium and be at the same level as each other, the plurality of ABS faces serving to generate positive pressure,
wherein a surface having the element is formed on the ABS face in the trailing side so as to further rise toward the recording medium, and a gap portion of the magnetic element is located on the surface having the element,
wherein a side face of the surface having the element is provided with an angled surface formed thereon which is angled relative to a width direction of the slider and which starts from a trailing edge of the surface having the element and gradually approaches a side face of the slider when proceeding toward the leading side, and wherein a gap portion of the magnetic element is located in the vicinity of the angled surface, and
wherein two of the angled surfaces are provided so as to have an apex formed at the trailing edge and gradually approach both lateral side-faces of the slider when proceeding toward the leading-side, respectively, and wherein a gap portion of the magnetic element is located at a position sandwiched between the two angled surfaces.

39. A magnetic head according to claim 38, wherein an inclination θ1 of the angled surfaces relative to the width direction of the slider is at least 20° and 60° at most.

40. A magnetic head according to claim 38, wherein the apex has a curved surface.

41. A magnetic head according to claim 38, wherein the surface having the element is provided with two angled surfaces at both sides thereof, each angled surface being angled relative to a width direction of the slider and starting from the trailing edge and gradually approaching the corresponding side face of the slider when proceeding toward the leading side, and the gap portion of the magnetic element is located between the two angled surfaces.

42. A magnetic head according to claim 38, wherein the surface facing the recording medium extends between the ABS faces and both side faces of the slider.

43. A magnetic head apparatus comprising:
a magnetic head according to claim 38; and
a supporting member for elastically supporting the magnetic head from the side opposite to the surface facing the recording medium.

44. A magnetic head comprising:
a slider; and
a magnetic element disposed on an end face of the slider in the trailing side for writing and/or reading,
wherein a plurality of ABS faces are formed on a surface of the slider facing a recording medium so as to rise toward the recording medium and be at the same level as each other, the plurality of ABS faces serving to generate positive pressure,
wherein a surface having the element is formed on the ABS face in the trailing side so as to further rise toward the recording medium, and a gap portion of the magnetic element is located on the surface having the element,
wherein a leading end face of the trailing ABS face and a leading end face of the surface having the element are inclined surfaces that are sloped relative to a depth of the slider and which gradually rise from the surface facing the recording medium toward the surface having the element, wherein a side face of the surface having the element is provided with an angled surface formed thereon which is angled relative to a width direction of the slider and which starts from a trailing edge of the surface having the element and gradually approaches a side face of the slider when proceeding toward the leading side, and wherein a gap portion of the magnetic element is located in the vicinity of the angled surface, and wherein two of the angled surfaces are provided so as to have an apex formed at the trailing edge and gradually approach both lateral side-faces of the slider when proceeding toward the leading-side, respectively, and wherein a gap portion of the magnetic element is located at a position sandwiched between the two angled surfaces.

45. A magnetic head according to claim 44, wherein an inclination θ1 of the angled surfaces relative to the width direction of the slider is at least 20° and 60° at most.

46. A magnetic head according to claim 44, wherein the apex has a curved surface.

47. A magnetic head according to claim 44, wherein the surface having the element is provided with two angled surfaces at both sides thereof, each angled surface being angled relative to a width direction of the slider and starting from the trailing edge and gradually approaching the corresponding side face of the slider when proceeding toward the leading side, and the gap portion of the magnetic element is located between the two angled surfaces.

48. A magnetic head according to claim 44, wherein both side faces of the surface having the element and the trailing ABS face are provided with respective angled surfaces formed thereon which are angled relative to a width direction of the slider and which start from respective trailing edges of the surface having the element and the trailing ABS face and gradually approach a side face of the slider when proceeding toward the leading side, and wherein a gap portion of the magnetic element is located in the vicinity of the angled surfaces.

49. A magnetic head according to claim 48, wherein the angled surface of the surface having the element and the angled surface of the trailing ABS face are continuous.

50. A magnetic head according to claim 48, wherein between a leading edge of the trailing ABS face and the surface facing the recording medium, a step face having a height lower than that of the ABS face is formed.

51. A magnetic head according to claim 44, wherein the surface facing the recording medium extends between the ABS faces and both side faces of the slider.

52. A magnetic head apparatus comprising:
a magnetic head according to claim 44; and
a supporting member for elastically supporting the magnetic head from the side opposite to the surface facing the recording medium.

53. A magnetic head comprising:
a slider; and
a magnetic element disposed on an end face of the slider in the trailing side for writing and/or reading,
wherein a plurality of ABS faces are formed on a surface of the slider facing a recording medium so as to rise toward the recording medium and be at the same level as each other, the plurality of ABS faces serving to generate positive pressure, wherein a surface having the element is formed on the ABS face in the trailing side so as to further rise toward the recording medium, and a gap portion of the magnetic element is located on the surface having the element, wherein a side face of the surface having the element is provided with an angled surface formed thereon which is angled relative to a width direction of the slider and which starts from a trailing edge of the surface having the element and gradually approaches a side face of the slider when proceeding toward the leading side, and wherein a gap portion of the magnetic element is located in the vicinity of the angled surface, and wherein between a leading edge of the trailing ABS face and the surface facing the recording medium, a step face having a height lower than that of the ABS face is formed.

54. A magnetic head according to claim 53, wherein two of the angled surfaces are provided so as to have an apex formed at the trailing edge and gradually approach both lateral side-faces of the slider when proceeding toward the leading-side, respectively, and wherein a gap portion of the magnetic element is located at a position sandwiched between the two angled surfaces.

55. A magnetic head according to claim 54, wherein an inclination θ1 of the angled surfaces relative to the width direction of the slider is at least 20° and 60° at most.

56. A magnetic head according to claim 54, wherein the apex has a curved surface.

57. A magnetic head according to claim 53, wherein the surface having the element is provided with two angled surfaces at both sides thereof, each angled surface being angled relative to a width direction of the slider and starting from the trailing edge and gradually approaching the corresponding side face of the slider when proceeding toward the leading side, and the gap portion of the magnetic element is located between the two angled surfaces.

58. A magnetic head according to claim 53, wherein the surface facing the recording medium extends between the ABS faces and both side faces of the slider.

59. A magnetic head apparatus comprising:
a magnetic head according to claim 53; and
a supporting member for elastically supporting the magnetic head from the side opposite to the surface facing the recording medium.

60. A magnetic head comprising:
a slider; and
a magnetic element disposed on an end face of the slider in the trailing side for writing and/or reading,
wherein a plurality of ABS faces are formed on a surface of the slider facing a recording medium so as to rise toward the recording medium and be at the same level as each other, the plurality of ABS faces serving to generate positive pressure,
wherein a surface having the element is formed on the ABS face in the trailing side so as to further rise toward the recording medium, and a gap portion of the magnetic element is located on the surface having the element,
wherein both side faces of the surface having the element and the trailing ABS face are provided with respective angled surfaces formed thereon which are angled relative to a width direction of the slider and which start from respective trailing edges of the surface having the element and the trailing ABS face and gradually approach a side face of the slider when proceeding toward the leading side, and wherein a gap portion of the magnetic element is located in the vicinity of the angled surfaces, and wherein between a leading edge of the trailing ABS face and the surface facing the recording medium, a step face having a height lower than that of the ABS face is formed.

61. A magnetic head according to claim 60, wherein the angled surface of the surface having the element and the angled surface of the trailing ABS face are continuous.

62. A magnetic head according to claim 60, wherein each of the surface having the element and the trailing ABS face is provided with two angled surfaces at both sides thereof, each of the angled surfaces of the surface having the element and the trailing ABS face being angled relative to a width direction of the slider and starting from the trailing edge and gradually approaching the corresponding side face of the slider when proceeding toward the leading side, and the gap portion of the magnetic element is located between the two angled surfaces of the surface having the element and the trailing ABS face.

63. A magnetic head according to claim 60, wherein the surface facing the recording medium extends between the ABS faces and both side faces of the slider.

64. A magnetic head apparatus comprising:

a magnetic head according to claim 60; and a supporting member for elastically supporting the magnetic head from the side opposite to the surface facing the recording medium.

* * * * *